US012679474B2

(12) United States Patent
Lee et al.

(10) Patent No.: US 12,679,474 B2
(45) Date of Patent: Jul. 14, 2026

(54) MOVING SPOILER

(71) Applicants: Hyundai Motor Company, Seoul (KR); Kia Corporation, Seoul (KR)

(72) Inventors: Hong Heui Lee, Suwon-si (KR); Jin Young Yoon, Gimpo-si (KR); Chan Joo Moon, Hwaseong-si (KR); Dong Eun Cha, Hwaseong-si (KR); Dong Ju Kim, Hwaseong-si (KR); Sung Hoon Son, Gyeongsan-si (KR); Jeong Bok Lee, Gyeongsan-si (KR); Bo Hwan Cha, Gyeongsan-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 408 days.

(21) Appl. No.: 18/372,867

(22) Filed: Sep. 26, 2023

(65) Prior Publication Data

US 2024/0391539 A1      Nov. 28, 2024

(30) Foreign Application Priority Data

May 22, 2023      (KR) ........................ 10-2023-0065683

(51) Int. Cl.
*B62D 35/00*      (2006.01)
*B62D 37/02*      (2006.01)
(52) U.S. Cl.
CPC ........... *B62D 35/007* (2013.01); *B62D 37/02* (2013.01)
(58) Field of Classification Search
CPC .............................. B62D 35/007; B62D 37/02
See application file for complete search history.

(56) References Cited

U.S. PATENT DOCUMENTS 3,059,562 A * 10/1962 Sturtevant .............. B60H 1/265
454/162
4,707,014 A * 11/1987 Rich .................... B60Q 1/2611
296/180.1
(Continued)

FOREIGN PATENT DOCUMENTS

CN        111017050 A      4/2020
CN        211519689 U      9/2020
(Continued)

OTHER PUBLICATIONS

Guy, Kevin; "Motor Vehicle Rear Spoiler"; FR3113276A1; Feb. 11, 2022. (Year: 2022).*

(Continued)

*Primary Examiner* — Jonathan Malikasim
(74) *Attorney, Agent, or Firm* — Morgan, Lewis & Bockius LLP

(57)      ABSTRACT

A moving spoiler that prevents a constituent element configured to move the spoiler from being exposed to the outside and matches the spoiler with an external appearance of an outer panel of a vehicle, and the moving spoiler includes a spoiler cover having an operating space formed at a rear side of a roof part, the operating space having a shape opened at a rear side thereof, a moving plate configured to move into the operating space or move to the outside of the operating space through the opening portion of the operating space, a guide mechanism between an inner surface of the operating space and the moving plate and configured to guide a movement of the moving plate, and a drive part configured to provide driving power for moving the moving plate.

12 Claims, 16 Drawing Sheets

(56)         References Cited

U.S. PATENT DOCUMENTS

| | | | | |
|---|---|---|---|---|
| 5,060,340 | A * | 10/1991 | Grassini .................. | B60S 1/583 |
| | | | | 296/180.1 |
| 9,868,478 | B2 * | 1/2018 | Kishima .............. | B60Q 1/0017 |
| 10,106,210 | B2 * | 10/2018 | Miller ................... | G01S 17/931 |
| 10,343,594 | B2 * | 7/2019 | Nakamura ........... | B60Q 1/0035 |
| 11,827,284 | B2 * | 11/2023 | Beierl .................... | B62D 37/02 |
| 2007/0236045 | A1 * | 10/2007 | Froeschle ............ | B62D 35/007 |
| | | | | 296/180.5 |
| 2012/0091752 | A1 * | 4/2012 | Algermissen ............. | B60J 7/22 |
| | | | | 296/180.1 |
| 2021/0229759 | A1 | 7/2021 | Vandersluis et al. | |
| 2022/0348271 | A1 * | 11/2022 | Marion .................. | B62D 35/02 |

FOREIGN PATENT DOCUMENTS

| | | | |
|---|---|---|---|
| DE | 20 2016 103 806 | U1 | 10/2017 |
| EP | 3 044 077 | B1 | 12/2019 |
| EP | 3 676 162 | A1 | 7/2020 |
| JP | 62-185684 | U | 11/1987 |
| JP | 2000-103370 | A | 4/2000 |
| JP | 2021-041919 | A | 3/2021 |
| KR | 10-1999-0019986 | U | 6/1999 |
| WO | 2019/043199 | A1 | 3/2019 |
| WO | 2019/246103 | A1 | 12/2019 |

OTHER PUBLICATIONS

Matsumura, Koji; "Deflector for Cargo Vehicle"; JPH06329053A; Nov. 29, 1994 (Year: 1994).*

* cited by examiner

MOVING SPOILER

CROSS REFERENCE TO RELATED APPLICATION

The present application claims priority to Korean Patent Application No. 10-2023-0065683, filed on May 22, 2023, the entire contents of which are incorporated herein for all purposes by this reference.

BACKGROUND

Technical Field

The present disclosure relates to a moving spoiler that prevents a constituent element configured to move the spoiler from being exposed to the outside and matches the spoiler with an external appearance of an outer panel of a vehicle.

Description of the Related Art

A moving spoiler serves to improve driving safety by mainly performing a downforce function for reducing a lift force that floats or lifts a vehicle when the vehicle travels at a predetermined vehicle speed or higher.

The moving spoiler is installed at an upper end of a rear side of the vehicle and moves rearward, thereby improving aerodynamic properties of the vehicle.

There has been proposed a spoiler in the related art in which a moving plate, which constitutes the spoiler, is installed as a separate component on an outer portion of the vehicle and moves by means of a link structure, or an outer panel of the vehicle serves as a moving plate that moves by means of a link structure.

However, because of the nature of the link structure, the structure of the spoiler necessarily defines an empty space after a link operates. For this reason, there is a problem with durability because an internal space is exposed to the outside. Further, there is a problem in that it is difficult to ensure quality related to wind sound, watertightness, and introduction of foreign substances such as dust.

Moreover, only a rectilinear motion of the moving plate may be implemented because the movement is implemented by the link structure, which causes a gap and a level difference. For this reason, it is difficult to match the outer panel of the vehicle and the spoiler on the same plane, and interruption occurs in terms of design, which causes a problem in which the spoiler is recognized as a separate structure.

The foregoing explained as the background is intended merely to aid in the understanding of the background of the present disclosure, and is not intended to mean that the present disclosure falls within the purview of the related art that is already known to those skilled in the art.

SUMMARY

The present disclosure is proposed to solve these problems and aims to provide a moving spoiler that prevents a constituent element configured to move the spoiler from being exposed to the outside and matches the spoiler with an external appearance of an outer panel of a vehicle.

To achieve the above-mentioned object, the present disclosure provides a moving spoiler including: a spoiler cover having an operating space having an opening portion at a rear side of the operating space, the spoiler cover is configured to be attached to a roof part such that roof part covers a portion of the operating space; a moving plate configured to move into the operating space or move to an outside of the operating space through the opening portion of the operating space; a guide mechanism between an inner surface of the operating space and the moving plate and configured to guide a movement of the moving plate; and a drive part configured to provide driving power for moving the moving plate.

The guide mechanism may include: a guide rail in the operating space and including rail parts extending from a front portion of the operating space to a rear portion of the operating space, and each of the rail parts has a curved shape that is curved upward and downward; and a moving unit configured to move forward or rearward together with the moving plate while being guided by the rail parts.

Each of the rail parts may have a groove shape, and the moving unit may include: a slider configured to move together with the moving plate; and roller parts on the slider, inserted into the rail parts, and configured to move along the rail parts.

The rail parts may include a first rail part and a second rail part, the guide rail may further include an inner rail including the first rail part, and an outer rail including the second rail part, the first rail part and the second rail part face each other in a leftward/rightward direction, and the roller parts may include a first roller part at a front end of a first side of the slider and inserted into the first rail part, and a second roller part at a rear end of a second side of the slider and inserted into the second rail part, the first and second sides of the slider oppose each other.

The drive part may provide rotational driving power, a rotational motion made by the drive part may be converted into a rectilinear motion, and the rectilinear motion may be transmitted to the moving plate.

The moving spoiler may include: a shaft connected to the drive part and configured to rotate; a pinion gear coupled to the shaft and configured to rotate together with the shaft; and a moving gear member coupled to the moving plate and having a rack gear extending from a front portion of the operating space to a rear portion of the operating space such that the rack gear engages with the pinion gear and moves forward or rearward together with the moving plate in accordance with a rotation of the pinion gear.

An upper lamp may be at an upper end of a rear side of the operating space, and the moving plate may move below the upper lamp.

A lower lamp may be at a lower end of a rear side of the operating space, and the moving plate may move above the lower lamp.

A strip may be at an upper end of the opening portion, and a top surface of the strip and a top surface of the moving plate may be aligned on the same plane.

Seal ribs may be protrude from a front lower end of the strip and a rear lower end of the strip toward the moving plate and supported on the top surface of the moving plate.

The top surface of the moving plate may include a seating groove, and the strip may be seated in the seating groove when the moving plate moves to the outside of the operating space.

An available space may be between the spoiler cover and a rear window glass, and a rear wiper may be installed in the available space.

According to the technical solution of the present disclosure, the internal structure of the spoiler is not exposed to the outside when the moving plate moves rearward, which improves the durability of the spoiler, prevents the introduction of wind sound, dust, and the like, ensures water-tightness, and suppresses vibration, noise, and rattling when the spoiler operates.

Moreover, the rear end of the spoiler is extended rearward by the rearward movement of the moving plate and moves a vortex, which is generated at the rear side of the vehicle, rearward, thereby minimizing a drag force generated by the vortex, and improving aerodynamic properties and fuel economy of the vehicle.

In addition, the movement of the spoiler is implemented by the movement of the moving plate, such that the spoiler is used when the vehicle travels at a high speed and in the sport mode, thereby improving the traveling performance of the vehicle. Further, the movement of the spoiler provides high-grade quality of the vehicle, thereby improving the marketability.

DETAILED DESCRIPTION

Figure 1:
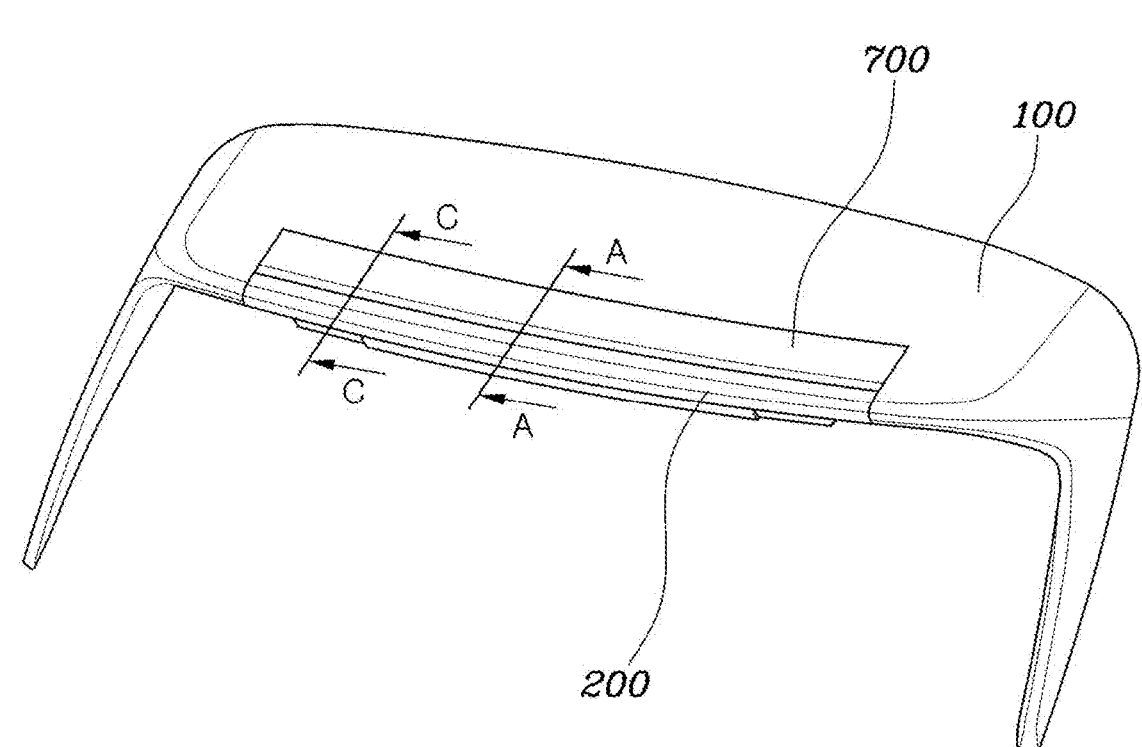
FIG. 1 is a view illustrating a shape made before a moving plate according to the present disclosure operates.
Figure 2:
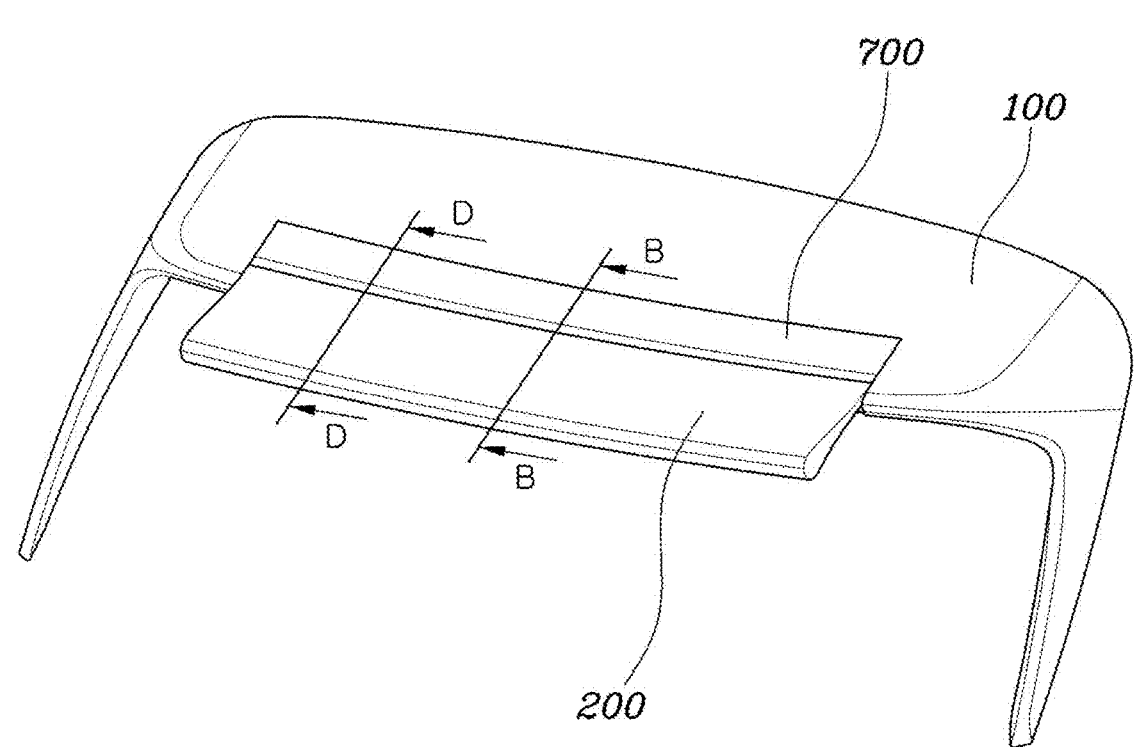
FIG. 2 is a view illustrating a shape made after the moving plate according to the present disclosure operates.

Hereinafter, embodiments disclosed in the present specification will be described in detail with reference to the accompanying drawings. The same or similar constituent elements are assigned with the same reference numerals regardless of reference numerals, and the repetitive description thereof will be omitted.

The suffixes 'module', 'unit', 'part', and 'portion' used to describe constituent elements in the following description are used together or interchangeably in order to facilitate the description, but suffixes do the themselves not have distinguishable meanings or functions.

In the description of the embodiments disclosed in the present specification, the specific descriptions of publicly known related technologies will be omitted when it is determined that the specific descriptions may obscure the subject matter of the embodiments disclosed in the present specification. In addition, it should be interpreted that the accompanying drawings are provided only to allow those skilled in the art to easily understand the embodiments disclosed in the present specification, and the technical spirit disclosed in the present specification is not limited by the accompanying drawings, and includes all alterations, equivalents, and alternatives that are included in the spirit and the technical scope of the present disclosure.

The terms including ordinal numbers such as "first," "second," and the like may be used to describe various constituent elements, but the constituent elements are not limited by the terms. These terms are used only to distinguish one constituent element from another constituent element.

When one constituent element is described as being "coupled" or "connected" to another constituent element, it should be understood that one constituent element can be coupled or connected directly to another constituent element, and an intervening constituent element can also be present between the constituent elements. When one constituent element is described as being "coupled directly to" or "connected directly to" another constituent element, it should be understood that no intervening constituent element is present between the constituent elements.

Singular expressions include plural expressions unless clearly described as different meanings in the context.

In the present specification, it should be understood the terms "comprises," "comprising," "includes," "including," "containing," "has," "having" or other variations thereof are inclusive and therefore specify the presence of stated features, integers, steps, operations, elements, components, or combinations thereof, but do not preclude the presence or addition of one or more other features, integers, steps, operations, elements, components, or combinations thereof.

A controller may include a communication device configured to communicate with another controller or a sensor to control a corresponding function, a memory configured to store an operating system, a logic command, and input/output information, and one or more processors configured to perform determination, computation, decision, or the like required to control the corresponding function.

Hereinafter, exemplary embodiments of the present disclosure will be described in detail with reference to the accompanying drawings.

A moving spoiler of the present disclosure includes: a spoiler cover 100 having an operating space 110 formed at a rear side of a roof part 10, the operating space 110 having a shape opened at a rear side thereof; a moving plate 200 configured to move into the operating space 110 or move to the outside of the operating space 110 through the opening portion 120 of the operating space 110; guide mechanisms provided between an inner surface of the operating space 110 and the moving plate 200 and configured to guide a movement of the moving plate 200; and a drive part 600 configured to provide driving power for moving the moving plate 200.

The description will be specifically described with reference to FIGS. 1 to 4. A space is formed at a center of the rear side of the roof part 10 and has a shape cut out in a 'U' shape.

The spoiler cover 100 includes an upper part 100*a* at an upper side thereof, and a lower part 100*b* at a rear side thereof. The upper part 100*a* is fixed in a shape that covers the space at the center of the rear side of the roof part 10 from an upper end thereof, and the lower part 100*b* is fixed in a shape that covers the space at the center of the rear side of the roof part 10, such that the operating space 110 is defined between the upper part 100*a* and the lower part 100*b*. The opening portion 120 is defined as the rear side of the operating space 110 that is opened.

Further, the moving plate 200 has a blade shape corresponding to the opening portion 120 and elongated in a leftward/rightward direction. A part of a rear portion of the moving plate 200 is exposed to the outside of the operating space 110 through the opening portion 120, and the remaining front portion of the moving plate 200 is provided in the operating space 110.

Therefore, when the spoiler operates, the moving plate 200 moves toward the rear side of the operating space 110 through the opening portion 120 and performs a spoiler function.

Further, the guide mechanism is installed in the operating space 110, and the guide mechanism guides a forward movement and a rearward movement of the moving plate 200.

In addition, the drive part 600 is installed in the operating space 110. The driving power of the drive part 600 is transmitted to the moving plate 200 to move the moving plate 200 forward or rearward.

The drive part 600 is configured to operate in response to an instruction of a controller.

Therefore, in case that an output value, which is related to a traveling state of a vehicle, satisfies a spoiler operational condition, the controller applies an operating instruction to the drive part 600, such that the moving plate 200 may operate to move.

With the above-mentioned configuration, an internal structure of the spoiler of the present disclosure is not exposed to the outside when the moving plate 200 moves rearward, which improves the durability of the spoiler, prevents the introduction of wind sound, dust, and the like, ensures watertightness, and suppresses vibration, noise, and rattling when the spoiler operates.

Moreover, a rear end of the spoiler is extended rearward by the rearward movement of the moving plate 200 and moves a vortex, which is generated at a rear side of the vehicle, rearward, thereby minimizing a drag force generated by the vortex, and improving aerodynamic properties and fuel economy of the vehicle.

In addition, the movement of the spoiler is implemented by the movement of the moving plate 200, such that the spoiler is used when the vehicle travels at a high speed and in a sport mode, thereby improving the traveling performance of the vehicle. Further, the movement of the spoiler provides high-grade quality of the vehicle, thereby improving the marketability.

Further, the guide mechanism of the present disclosure includes guide rails 300 provided in the operating space 110 and each having rail parts 311 and 321 formed in a forward/rearward direction and each having a curved shape curved upward and downward, and a moving unit configured to move forward or rearward together with the moving plate 200 while being guided by the rail parts 311 and 321.

The description will be described with reference to FIGS. 5 to 8. The guide rails 300 are provided in the operating space 110, and lower ends of the guide rails 300 are coupled to a bottom surface of the lower part 100*b*.

The guide rail 300 is elongated forward and rearward in a longitudinal direction. The rail parts 311 and 321 are provided on a lateral surface of the guide rail 300 and disposed in a longitudinal direction.

In particular, middle portions of the rail parts 311 and 321, which are formed in a direction from a front side to a rear side thereof, are formed to be curved downward.

Further, the moving unit is configured to be guided along the rail parts 311 and 321. The moving plate 200 is coupled to the moving unit, such that the moving plate 200 moves forward or rearward together with the moving unit.

That is, the moving plate 200 also moves in an upward/downward direction while moving forward or rearward along the rail parts 311 and 321, such that the moving plate 200 moves forward or rearward along a curved movement route. Therefore, when the moving plate 200 moves rearward, a portion of the spoiler cover 100, which is connected to the moving plate 200, may be matched with or aligned with the moving plate 200 on the same plane.

Moreover, because the guide mechanism is installed in the spoiler, the guide mechanism may be applied to a spoiler in the related art and applied to spoilers of other types of vehicles, such that the guide mechanism may be used in common.

Further, the moving unit includes a slider 400 configured to move together with the moving plate 200, and roller parts 410 provided on the slider 400, inserted into the rail parts 311 and 321 each having a groove shape, and configured to move along the rail parts 311 and 321.

Furthermore, the guide rail 300 is configured such that the rail part 311 of an inner rail 310 and the rail part 321 of an outer rail 320 face each other in the leftward/rightward direction. The roller parts 410 may be respectively provided at front and rear ends at two opposite sides of the slider 400 and inserted into the rail part 311 of the inner rail 310 and the rail part 321 of the outer rail 320.

The description will be described with reference to FIGS. and 9 to 11. A top surface of a moving gear member 500, which will be described below, is coupled to the bottom surface of the moving plate 200, and the slider 400 having a block shape is coupled to one end of the moving gear member 500, such that the slider 400 and the moving plate 200 move together.

Further, the roller parts 410 are rotatably coupled to the two opposite sides of the slider 400, and rubber members made of rubber are fitted with the roller parts 410 while surrounding the roller parts 410, such that the roller parts 410 may roll while generating friction with inner surfaces of the rail parts 311 and 321.

Further, the guide rail 300 is configured such that the pair of inner and outer rails 310 and 320 face each other. The rail parts 311 and 321 are respectively provided on a lateral surface of the inner rail 310 and a lateral surface of the outer rail 320 that face each other.

In this case, the rail part 321 of the outer rail 320 may be formed in a shape further extending rearward than the rail part 311 of the inner rail 310. The roller part 410 provided on an outer surface of the slider 400 is coupled to a front end of the slider 400, and the roller part 410 provided on an inner surface of the slider 400 is coupled to a rear end of the slider 400.

Therefore, the slider 400 may move along the rail parts 311 and 321 in a state in which the roller part 410 coupled to the front end of the slider 400 is inserted into the rail part 321 of the outer rail 320, and the roller part 410 coupled to the rear end of the slider 400 is inserted into the rail part 311 of the inner rail 310.

Therefore, because the roller parts 410 provided at the front and rear sides of the slider 400 are supported on the rail parts 311 and 321, the slider 400 may stably move along the rail parts 311 and 321 without swaying forward and rearward, such that the stable movement of the moving plate 200 may be implemented.

For reference, the guide rails 300 and the guide mechanisms each including the moving unit are symmetrically installed at two opposite sides based on a middle point of the moving plate 200 and guide the movement of the moving plate 200.

Meanwhile, the spoiler of the present disclosure may be configured such that the drive part 600 may provide rotational driving power, a rotational motion made by the drive part 600 may be converted into a rectilinear motion, and the rectilinear motion may be transmitted to the moving plate 200.

Further, the spoiler of the present disclosure includes a shaft 610 connected to the drive part 600 and configured to rotate, pinion gears 620 coupled to the shaft 610 and configured to rotate together with the shaft 610, and the moving gear members 500 coupled to the moving plate 200 and each having a rack gear 510 provided in the forward/rearward direction such that the rack gear 510 engages with the pinion gear 620 and moves forward or rearward together with the moving plate 200 in accordance with a rotation of the pinion gear 620.

Figure 12:
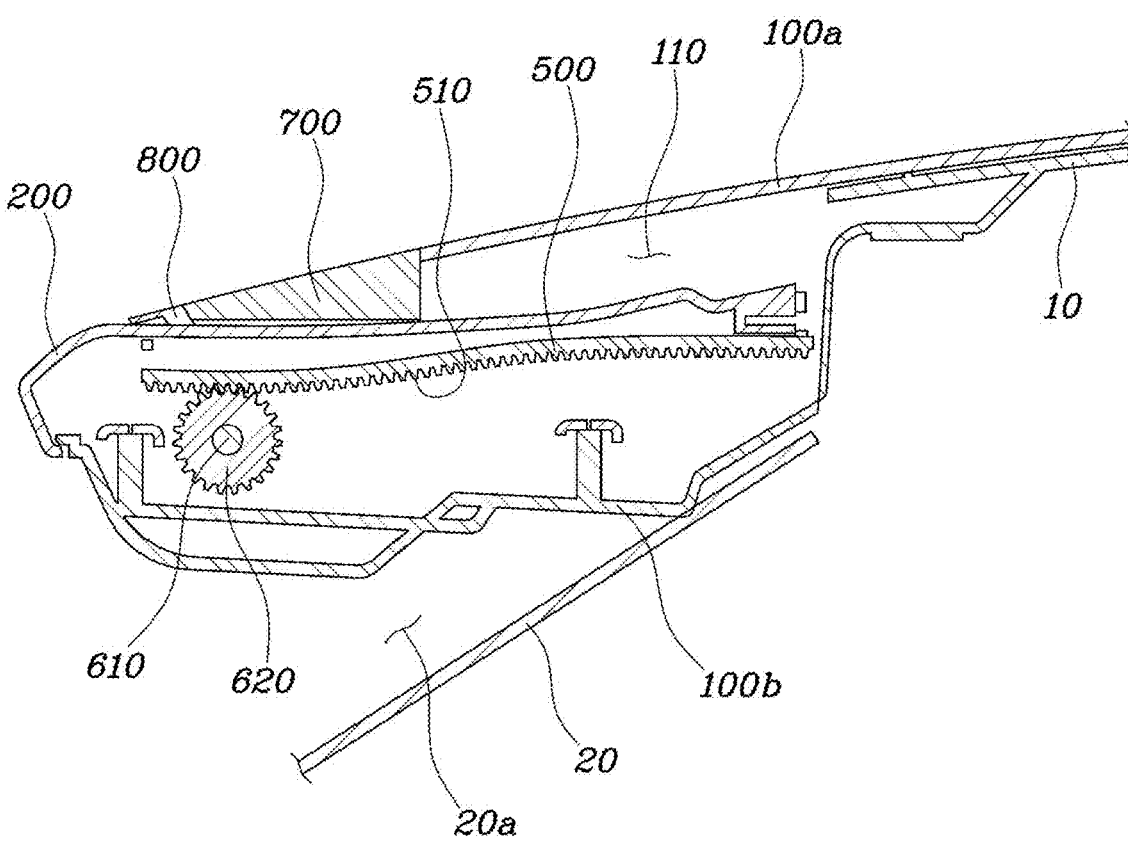
FIG. 12 is a cross-sectional view taken along line C-C in FIG. 1.
Figure 13:
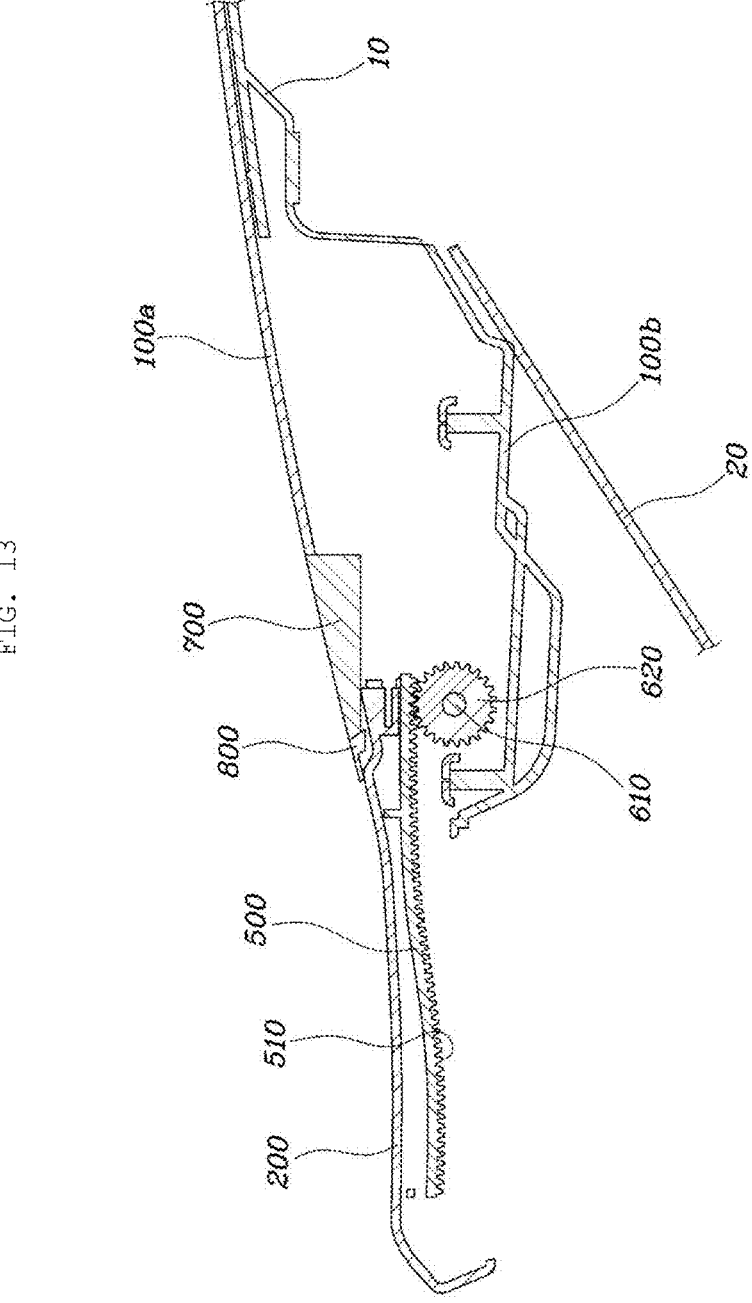
FIG. 13 is a cross-sectional view taken along line D-D in FIG. 2.

The description will be described with reference to FIGS. 7, 12, and 13. The drive part 600 may be a motor configured to generate rotational driving power. The drive part 600 may be coupled to a center of a bottom surface of the lower part 100b.

Further, the shaft 610 is elongated in a leftward/rightward width direction of an axis of the drive part 600, and the shaft 610 is rotated by the rotational driving power of the drive part 600.

The cylindrical pinion gears 620 are fixed to two opposite ends of the shaft 610 and rotate together with the shaft 610.

Further, the moving gear member 500 elongated in the forward/rearward longitudinal direction is coupled between the moving plate 200 and the slider 400, the rack gear 510 is provided on a bottom surface of the moving gear member 500, and the pinion gear 620 engages with the rack gear 510.

Therefore, when the drive part 600 operates, the pinion gear 620 rotates together with the shaft 610, a rotational force of the pinion gear 620 is transmitted to the rack gear 510, and the moving gear member 500 having the rack gear 510 moves forward or rearward, such that the moving plate 200 coupled to the moving gear member 500 may move forward or rearward together with the moving gear member 500.

As described above, in the present disclosure, the single motor may be used to move the moving plate 200, thereby simplifying the moving structure of the spoiler and reducing the weight and costs.

Meanwhile, in the present disclosure, an upper lamp 700 may be provided at an upper end of the rear side of the operating space 110, and the moving plate 200 may move below the upper lamp 700.

Figure 3:
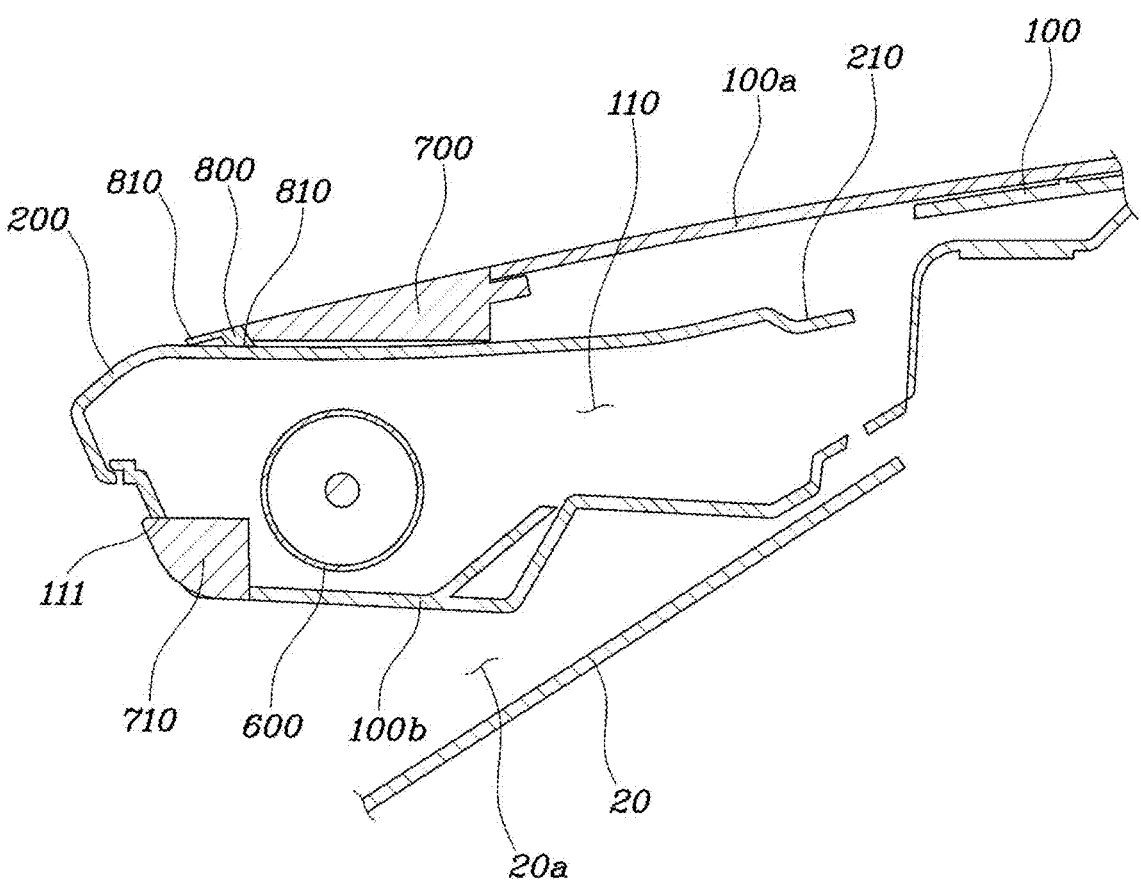
FIG. 3 is a cross-sectional view taken along line A-A in FIG. 1.
Figure 3:
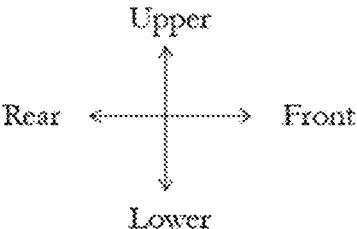
Figure 4:
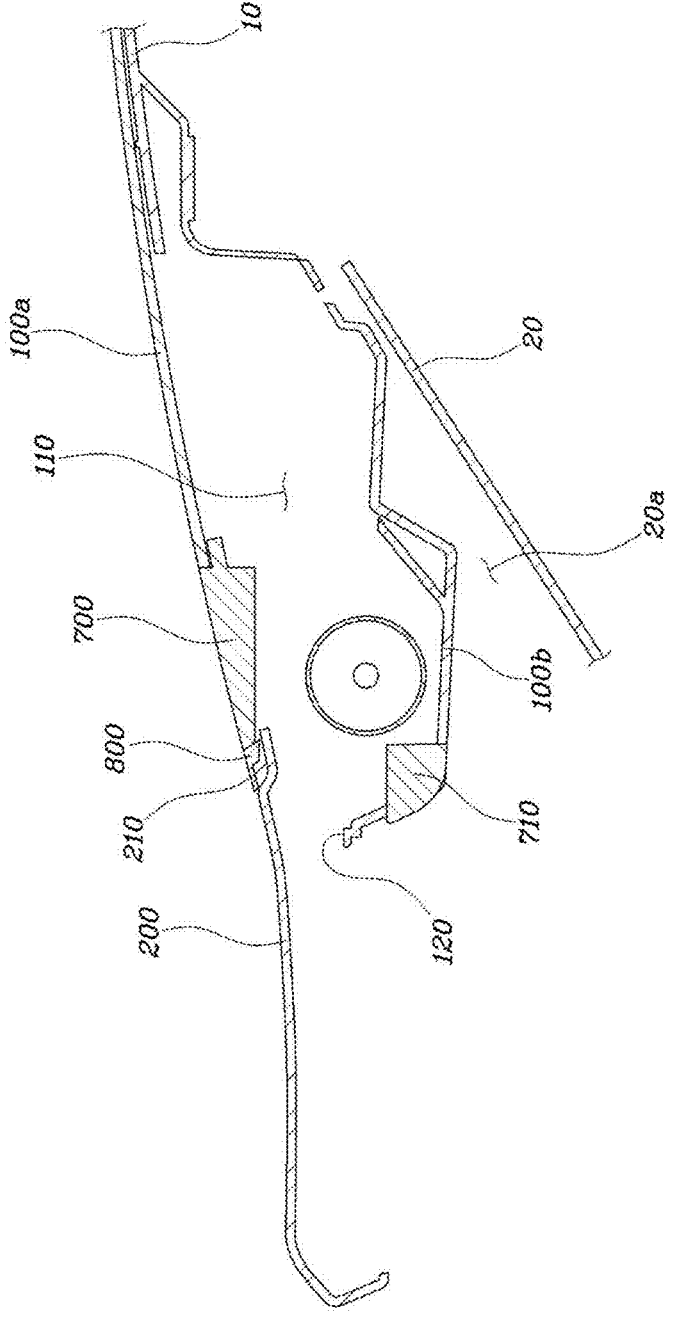
FIG. 4 is a cross-sectional view taken along line B-B in FIG. 2.
Figure 5:
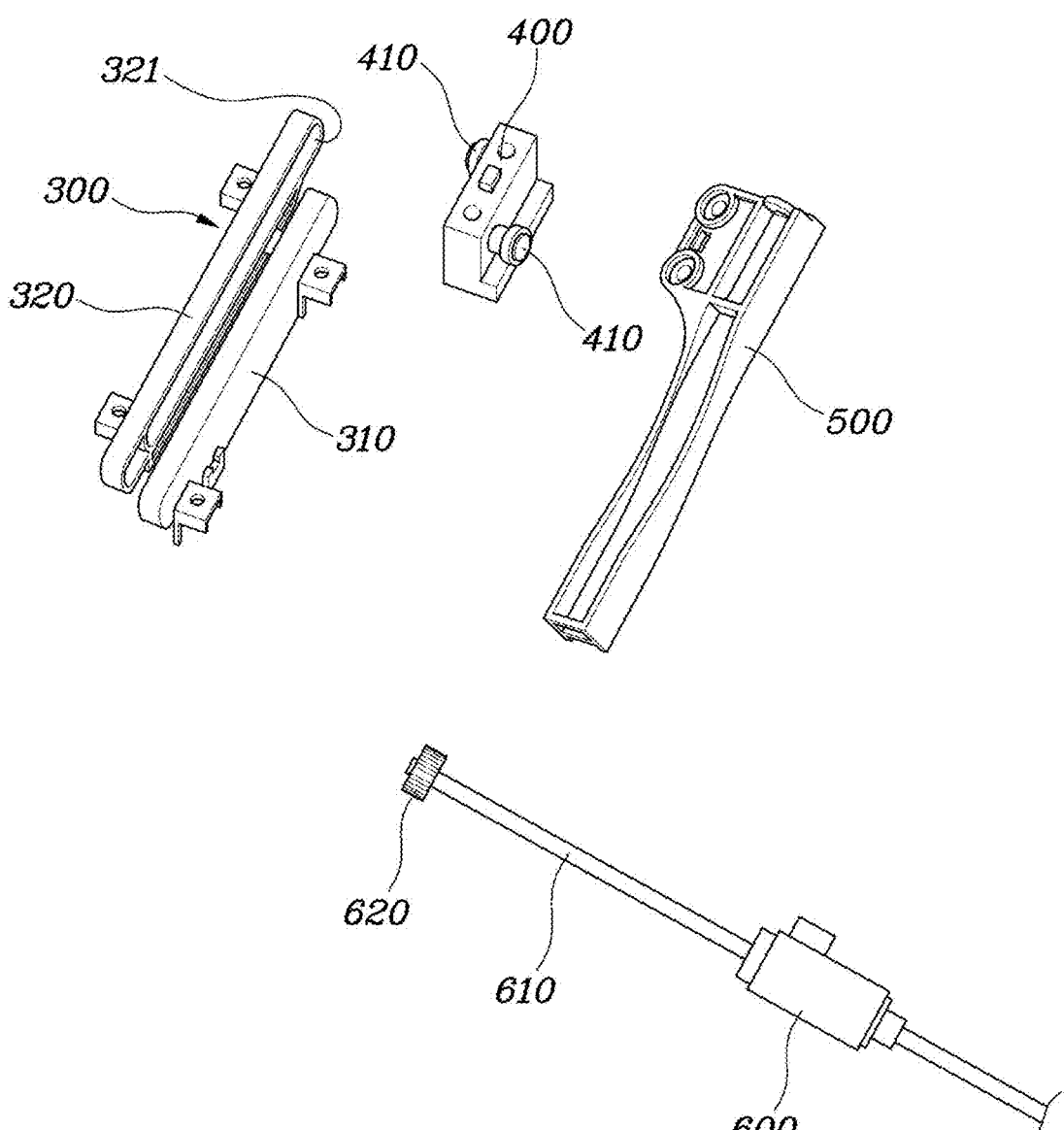
FIG. 5 is a view illustrating a state in which constituent elements of a guide mechanism according to the present disclosure are disassembled.
Figure 6:
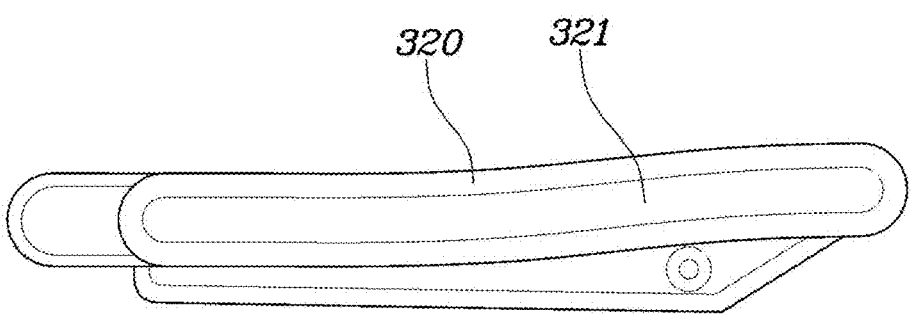
FIG. 6 is a view illustrating a state in which a guide rail according to the present disclosure is disassembled.
Figure 6:
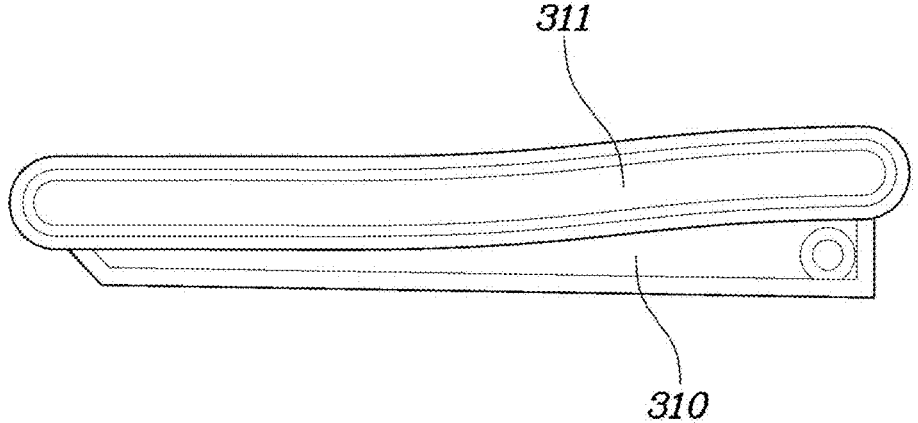

For example, the upper lamp 700 may be a high-mounted stop lamp (HMSL). As illustrated in FIGS. 3 and 4, the upper lamp 700 may be assembled so that a front end of the upper lamp 700 is mounted at a rear end of the upper part 100a, and a top surface of the upper lamp 700 is matched with or aligned with a top surface rim of the upper part 100a on the same plane.

Further, the upper lamp 700 has a triangular cross-section elongated in the leftward/rightward width direction, such that an inclined surface of the upper end of the upper lamp 700 may be exposed to the outside.

In addition, the moving plate 200 moves forward or rearward below the upper lamp 700.

Figure 14:
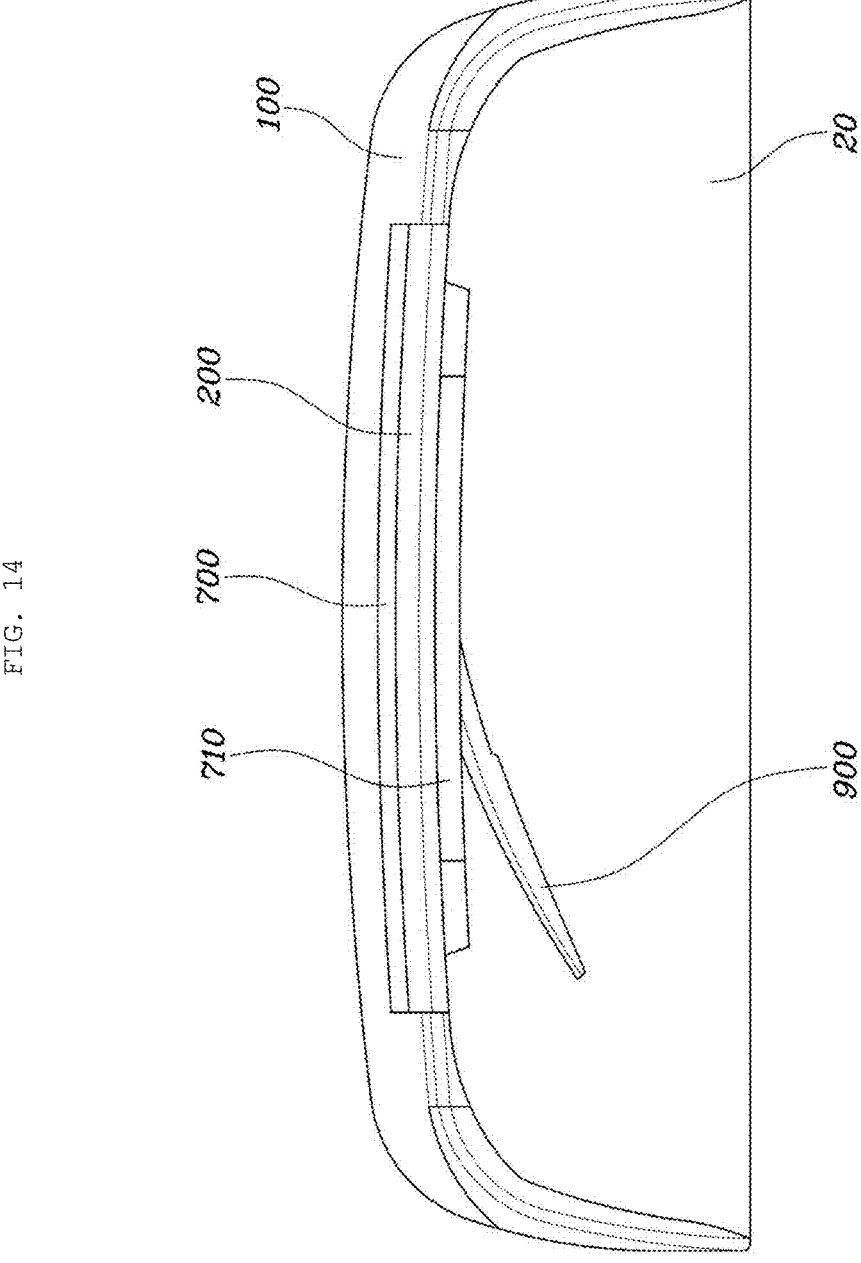
FIG. 14 is a view illustrating an upper lamp and a lower lamp in an operating state of the moving plate according to the present disclosure when viewed from the rear side.

Therefore, as illustrated in FIG. 14, the visibility of the upper lamp may be ensured because the moving plate 200 does not cover a light source of the upper lamp 700, which is visible from the rear side of the vehicle, not only in a state in which the moving plate 200 is positioned at the front side but also in a state in which the moving plate 200 is moved rearward.

Further, in the present disclosure, a lower lamp 710 may be provided at a lower end of the rear side of the operating space 110, and the moving plate 200 may move above the lower lamp 710.

For example, the lower lamp 710 may be a high-mounted stop lamp (HMSL). As illustrated in FIGS. 3 and 4, a mounting hole 111 is formed at a lower end of a rear side of the lower part 100b, and a front end of the lower lamp 710 is mounted in the mounting hole 111.

Further, the lower lamp 710 is elongated in the leftward/rightward width direction and shaped such that front and bottom surfaces thereof are exposed to the outside through the mounting hole 111.

In addition, the moving plate 200 moves forward or rearward above the lower lamp 710.

Therefore, as illustrated in FIG. 14, the visibility of the lower lamp may be ensured because the moving plate 200 does not cover a light source of the lower lamp 710, which is visible from the rear side of the vehicle, not only in a state in which the moving plate 200 is positioned at the front side but also in a state in which the moving plate 200 is moved rearward.

Further, in the present disclosure, a strip 800 is provided at an upper end of the opening portion 120, and a top surface of the strip 800 and a top surface of the moving plate 200 may be matched or aligned on the same plane.

For example, as illustrated in FIGS. 3 and 4, the strip 800 may be assembled so that a front end of the strip 800 is fixed to a rear end of the upper lamp 700, and the top surface of the strip 800 is matched with or aligned with a top surface of a rear end of the upper lamp 700 on the same plane.

Further, the strip 800 is elongated in the leftward/rightward width direction, and seal ribs 810 are shaped to protrude from a front lower end and a rear lower end of the strip 800 toward the moving plate 200 and supported on the top surface of the moving plate 200.

In particular, the seal rib 810 is shaped such that a top surface thereof is directed downward toward the moving plate 200. When the moving plate 200 moves forward or rearward, the top surface of the moving plate 200 is continuously connected to the top surface of the seal rib 810.

Therefore, a portion of the top surface of the strip 800, which is connected to the top surface of the moving plate 200, is implemented to have a seamless surface without a gap, a level difference, or interruption, such that the wind smoothly flows along the spoiler in the direction from the front side to the rear side, which may prevent noise or vibration caused by the wind when the vehicle travels.

In addition, the strip 800 is supported on the top surface of the moving plate 200 and performs a sealing function, thereby ensuring watertightness and preventing moisture, dust, and the like from being introduced into the operating space 110.

Further, a seating groove 210 may be formed in the top surface of the moving plate, such that the strip 800 may be seated in the seating groove 210 when the moving plate 200 moves to the outside of the operating space 110.

That is, the seating groove 210 having a 'V' shape is formed in the leftward/rightward width direction at a front end of the top surface of the moving plate 200, and the strip 800 enters the seating groove 210 and is seated in the seating groove 210.

Therefore, the portion of the top surface of the strip 800, which is connected to the top surface of the moving plate 200, is matched with or aligned with the top surface of the moving plate 200 on the same plane, thereby more assuredly implementing the seamless surface.

Meanwhile, in the present disclosure, an available space 20a may be defined between the spoiler cover 100 and a rear window glass 20, and a rear wiper 900 may be installed in the available space 20a.

Figure 7:
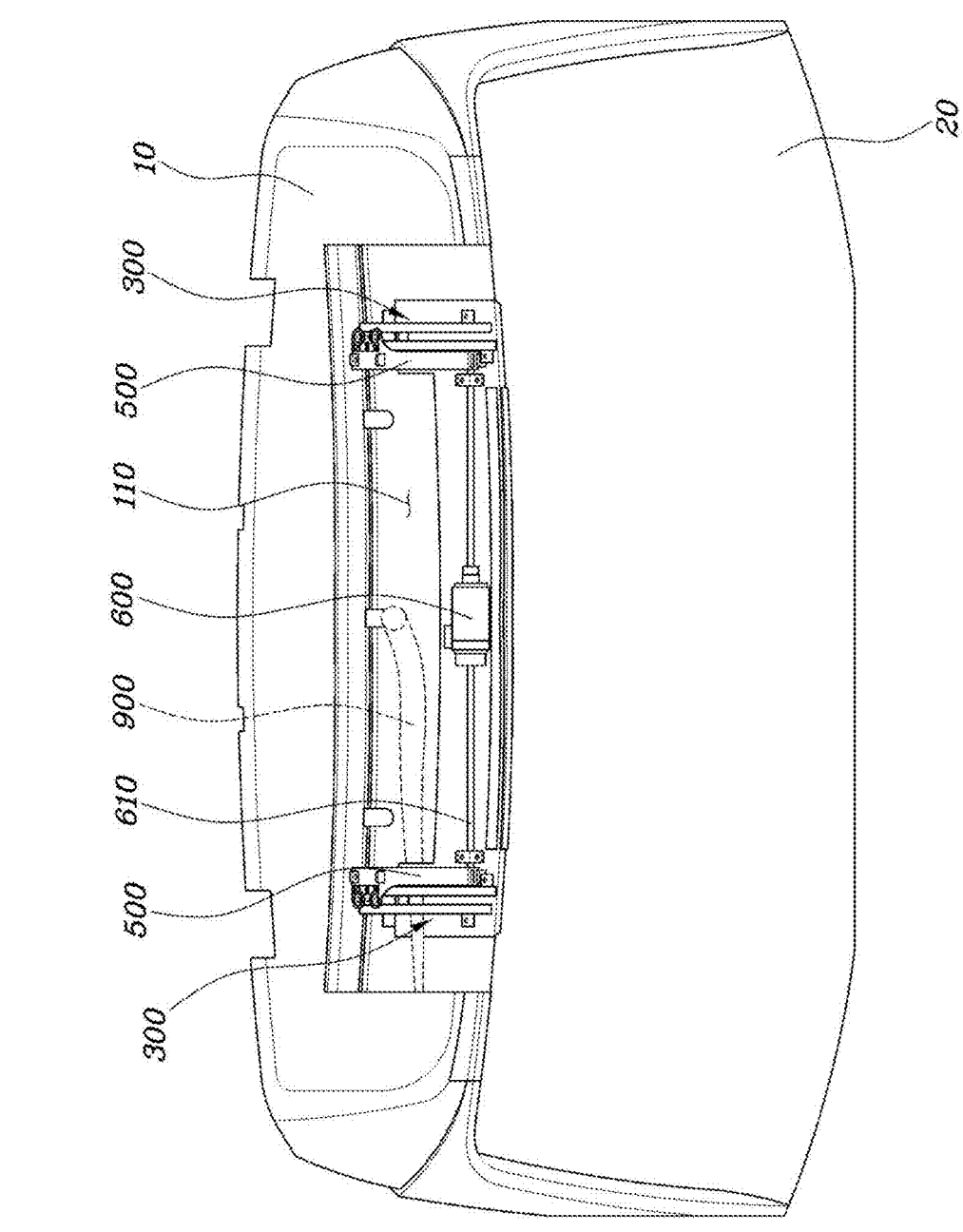
FIGS. 7 and 8 are views illustrating a process in which the moving plate is moved forward and rearward by the guide mechanism according to the present disclosure.
Figure 8:
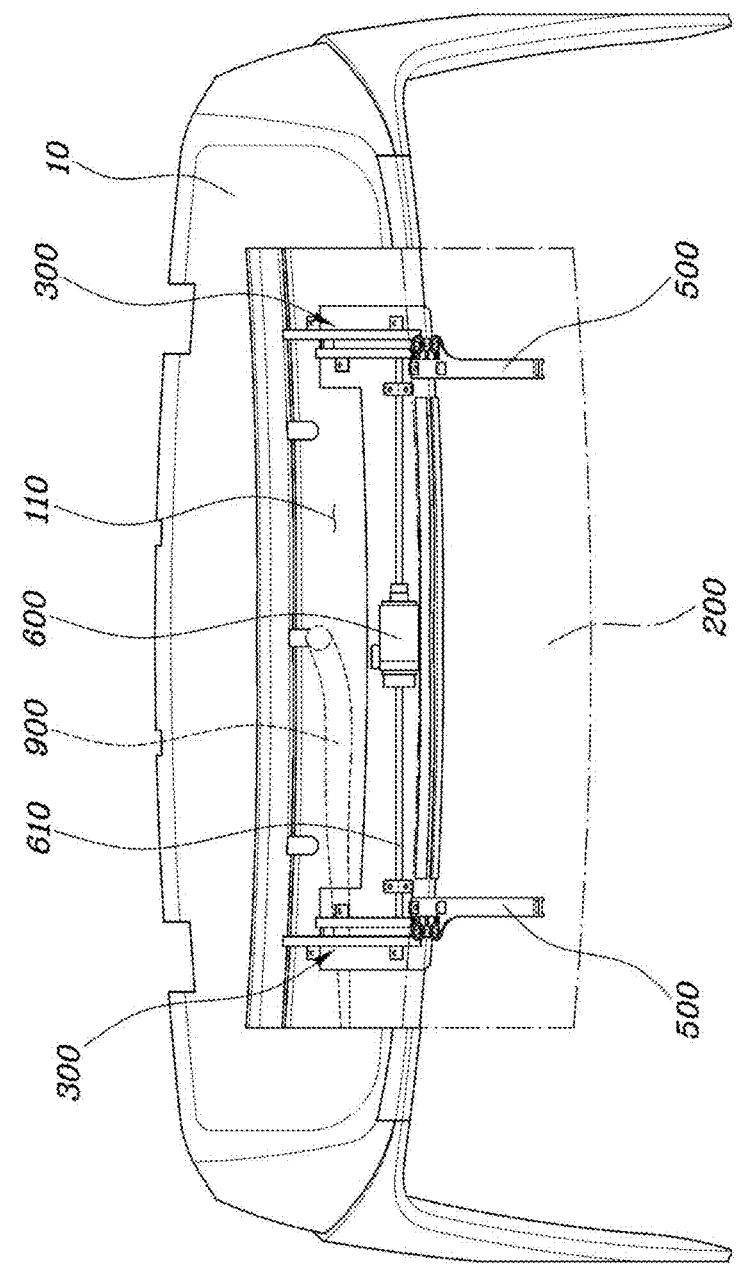
Figure 9:
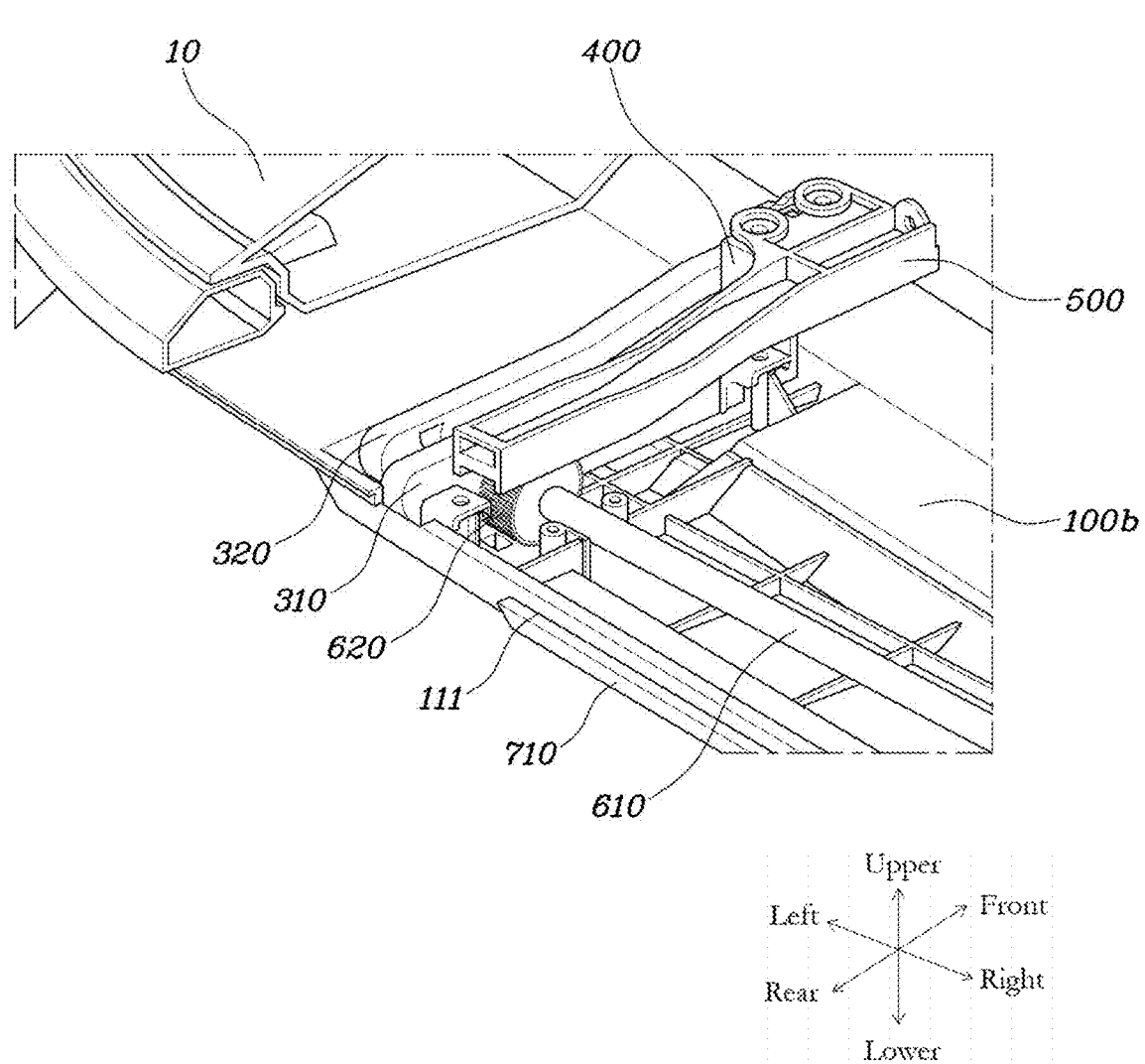
FIGS. 9 to 11 are views for explaining an operational principle of the guide mechanism that guides a movement of the moving plate according to the present disclosure.
Figure 10:
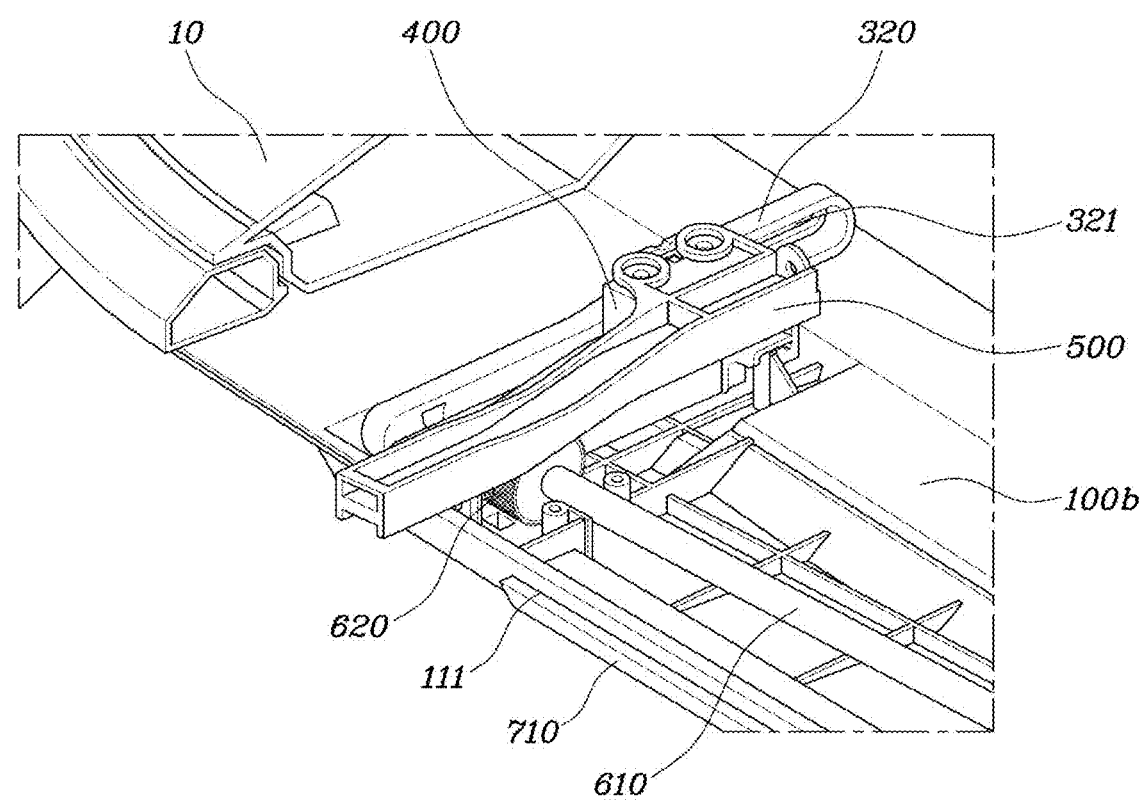
Figure 11:
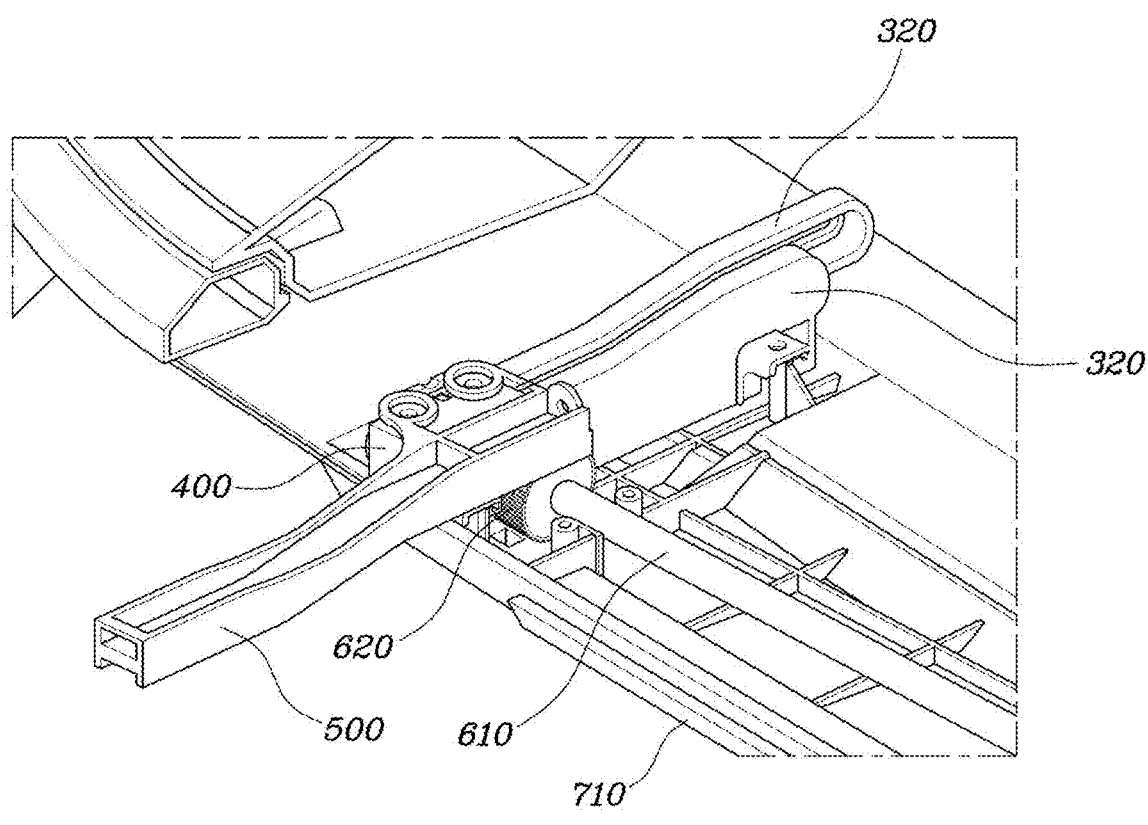
Figure 15:
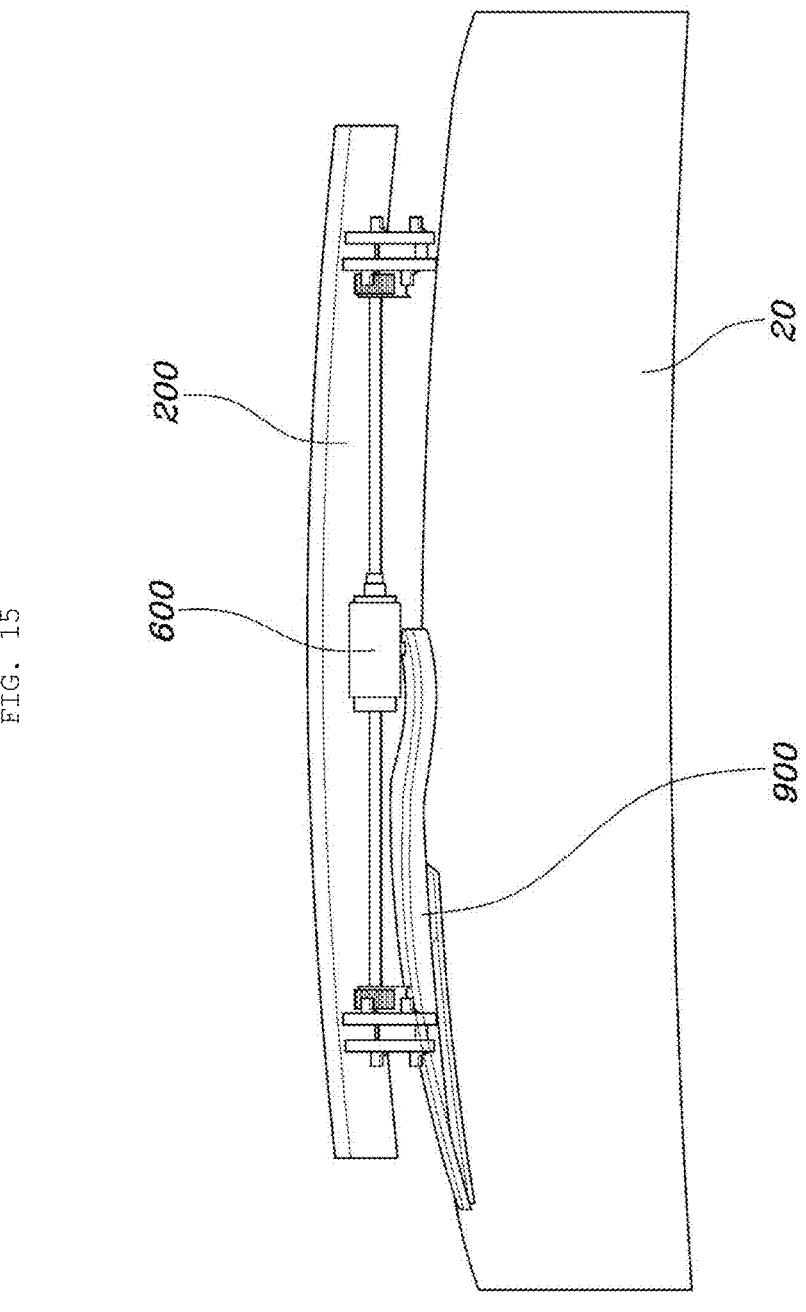
FIG. 15 is a view illustrating a state in which a rear wiper is installed on a rear window glass according to the present disclosure.

That is, as illustrated in FIGS. 7 and 15, the lower part 100b of the spoiler cover 100 extends rearward, such that the empty available space 20a is defined between the lower part 100b of the spoiler cover 100 and an upper end of the rear window glass 20.

Therefore, the rear wiper 900 is installed in the available space 20a, which may minimize the rear wiper 900 exposed to the external appearance.

Hereinafter, a process of operating the moving spoiler according to the present disclosure will be exemplarily described.

Figure 16:
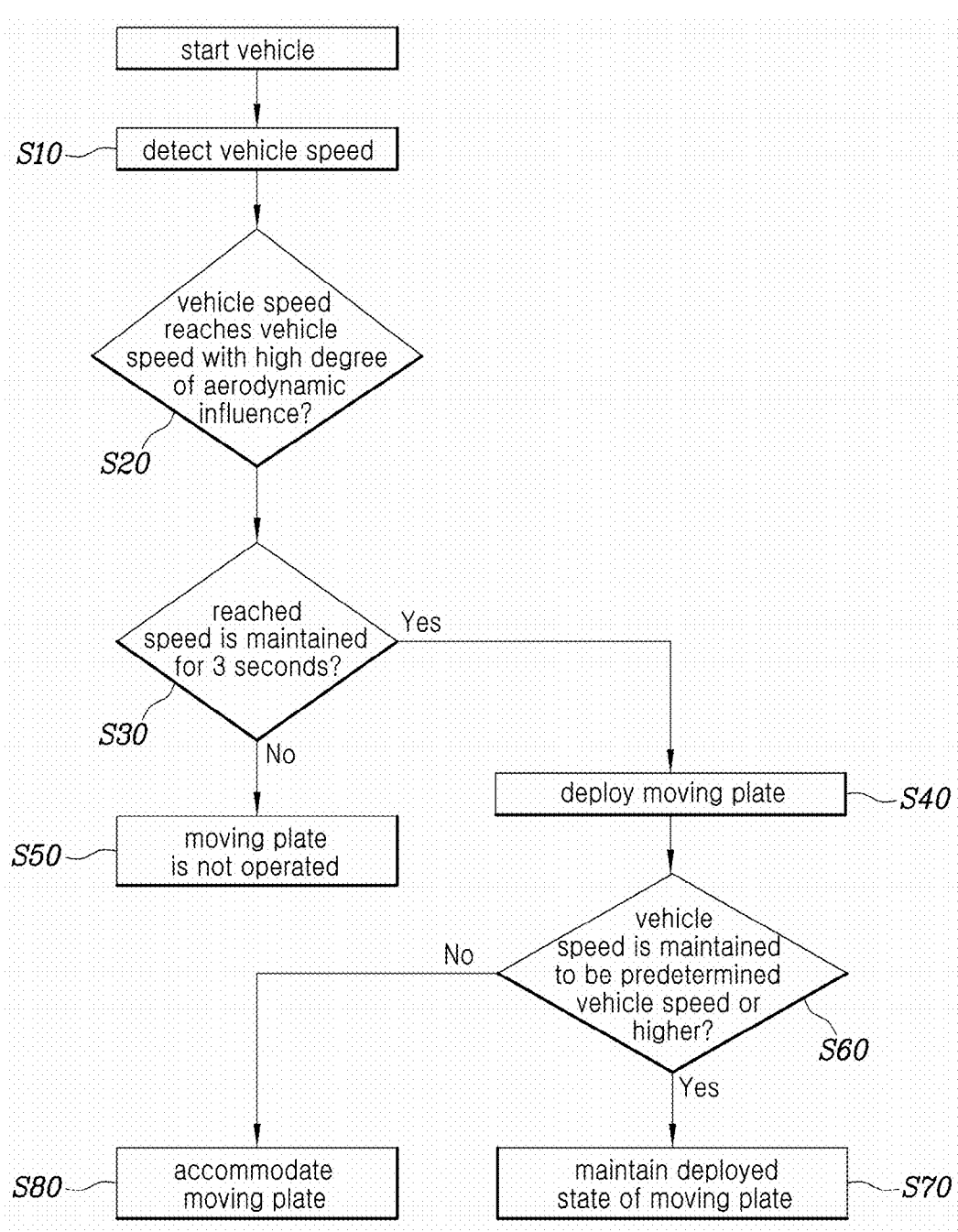
FIG. 16 is a flow chart illustrating a process of controlling an operation of the moving spoiler according to the present disclosure.

With reference to FIG. 16, a vehicle speed is detected (S10) while the vehicle travels, and whether a spoiler deployment condition is satisfied is determined depending on the detected vehicle speed (S20).

Whether the spoiler deployment condition is satisfied may be determined depending on a degree of aerodynamic influence on the vehicle.

For example, a low and middle-speed section of 80 kph or lower represents a vehicle speed with a low degree of aerodynamic influence, and a high-speed section of more than 80 kph represents a vehicle speed with a high degree of aerodynamic influence. Therefore, the spoiler deployment condition may be satisfied when the vehicle speed reaches the high-speed section of more than 80 kph.

Therefore, when the spoiler deployment condition is satisfied, whether the corresponding vehicle speed is maintained for a predetermined time (e.g., 3 seconds) or more is determined (S30).

Further, in case that the corresponding vehicle speed is maintained for the predetermined time or more, the moving plate 200 is controlled to be deployed rearward, such that the rear end of the spoiler extends rearward (S40).

Therefore, a vortex, which is generated at the rear side of the vehicle, is moved rearward, thereby minimizing a drag force generated by the vortex, and improving aerodynamic properties and fuel economy of the vehicle.

In contrast, in case that the corresponding vehicle speed cannot be maintained for the predetermined time or more, the moving plate 200 is controlled so as not to be operated (S50).

Further, in the state in which the moving plate 200 is deployed rearward, whether the vehicle speed of the vehicle is maintained to be a predetermined vehicle speed or higher is monitored (S60).

In case that the monitoring result indicates that the vehicle speed is maintained to be the predetermined vehicle speed or higher, the vehicle travels in a state in which the rearward deployed state of the moving plate 200 is maintained (S70). In contrast, in case that the monitoring result indicates that the vehicle speed cannot be maintained to be the predetermined vehicle speed or higher, the moving plate 200 is controlled to be accommodated forward (S80).

In addition, in the present disclosure, the moving plate 200 may also be controlled to be deployed and accommodated depending on a traveling mode of the vehicle.

For example, in case that a user changes the traveling mode of the vehicle to a sport mode, the moving plate 200 may be controlled to be deployed rearward.

In contrast, when the user changes the traveling mode from the sport mode to another traveling mode such as a drive mode, the moving plate 200 may be controlled to be accommodated forward.

As described above, in the present disclosure, the movement of the spoiler is implemented by the movement of the moving plate 200, such that the spoiler is used when the vehicle travels at a high speed and in the sport mode, thereby improving the traveling performance of the vehicle. Further, the movement of the spoiler provides high-grade quality of the vehicle, thereby improving the marketability.

In particular, the internal structure of the spoiler of the present disclosure is not exposed to the outside when the moving plate 200 moves rearward, which improves the durability of the spoiler, prevents the introduction of wind sound, dust, and the like, ensures watertightness, and suppresses vibration, noise, and rattling when the spoiler operates.

While the present disclosure has been described with reference to the specific examples, it is apparent to those skilled in the art that various modifications and alterations may be made within the technical spirit of the present disclosure, and these modifications and alterations belong to the appended claims.

What is claimed is:

1. A moving spoiler comprising:
   a spoiler cover having an operating space having an opening portion at a rear side of the operating space, the spoiler cover is configured to be attached to a roof part such that the roof part covers a portion of the operating space;
   a moving plate configured to move into the operating space or move to an outside of the operating space through the opening portion of the operating space;
   a guide mechanism between an inner surface of the operating space and the moving plate and configured to guide a movement of the moving plate; and
   a drive part configured to provide driving power for moving the moving plate,
   wherein based on the moving plate being moved rearward through the opening portion, an internal structure of the spoiler is not exposed to the outside of the operating space,
   wherein the guide mechanism is mounted in the operating space, and
   wherein the guide mechanism comprises a moving unit configured to move together with the moving plate by the guide mechanism.

2. The moving spoiler of claim 1, wherein the guide mechanism further comprises:
   a guide rail in the operating space and including rail parts extending from a front portion of the operating space to a rear portion of the operating space, and each of the rail parts has a curved shape that is curved upward and downward,
   wherein the moving unit is configured to move forward or rearward together with the moving plate while being guided by the rail parts.

3. The moving spoiler of claim 2, wherein each of the rail parts has a groove shape, and the moving unit comprises:

a slider configured to move together with the moving plate; and roller parts on the slider, inserted into the rail parts, and configured to move along the rail parts.

4. The moving spoiler of claim 3, wherein the rail parts include a first rail part and a second rail part, wherein the guide rail further includes:

an inner rail including the first rail part, and an outer rail including the second rail part, wherein the first rail part and the second rail part face each other in a leftward/rightward direction, and wherein the roller parts include:

a first roller part at a front end of a first side of the slider and inserted into the first rail part, and a second roller part at a rear end of a second side of the slider and inserted into the second rail part, the first and second sides of the slider oppose each other.

5. The moving spoiler of claim 1, wherein the drive part provides rotational driving power, a rotational motion made by the drive part is converted into a rectilinear motion, and the rectilinear motion is transmitted to the moving plate.

6. The moving spoiler of claim 5, comprising:

a shaft connected to the drive part and configured to rotate;

a pinion gear coupled to the shaft and configured to rotate together with the shaft; and a moving gear member coupled to the moving plate and having a rack gear extending from a front portion of the operating space to a rear portion of the operating space such that the rack gear engages with the pinion gear and moves forward or rearward together with the moving plate in accordance with a rotation of the pinion gear.

7. The moving spoiler of claim 1, further comprising an upper lamp at an upper end of a rear side of the operating space, and the moving plate moves below the upper lamp.

8. The moving spoiler of claim 1, further comprising a lower lamp at a lower end of a rear side of the operating space, and the moving plate moves above the lower lamp.

9. The moving spoiler of claim 1, further comprising a strip at an upper end of the opening portion, and a top surface of the strip and a top surface of the moving plate are aligned on the same plane.

10. The moving spoiler of claim 9, further comprising seal ribs protruding from a front lower end of the strip and a rear lower end of the strip toward the moving plate and supported on the top surface of the moving plate.

11. The moving spoiler of claim 9, wherein the top surface of the moving plate includes a seating groove, and the strip is seated in the seating groove when the moving plate moves to the outside of the operating space.

12. The moving spoiler of claim 1, wherein an available space is between the spoiler cover and a rear window glass, and a rear wiper is installed in the available space.

* * * * *